(12) United States Patent
Brzezinski et al.

(10) Patent No.: US 7,573,815 B2
(45) Date of Patent: Aug. 11, 2009

(54) FLOW CONTROL AND CONGESTION MANAGEMENT FOR RANDOM SCHEDULING IN TIME-DOMAIN WAVELENGTH INTERLEAVED NETWORKS

(75) Inventors: Andrew Brzezinski, Belmont, MA (US); Iraj Saniee, New Providence, NJ (US); Indra Widjaja, Florham Park, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 698 days.

(21) Appl. No.: 11/072,163

(22) Filed: Mar. 4, 2005

(65) Prior Publication Data

US 2006/0198299 A1   Sep. 7, 2006

(51) Int. Cl.
*H04L 12/26* (2006.01)
(52) U.S. Cl. .................................... 370/230
(58) Field of Classification Search ............... 370/205, 370/229, 347, 230, 230.1, 231, 232, 233, 370/234, 235, 235.1, 236, 236.1, 236.2, 237, 370/238, 238.1, 239, 240; 398/75, 155; 418/36; 455/69; 709/234
See application file for complete search history.

(56) References Cited

U.S. PATENT DOCUMENTS

| | | | | |
|---|---|---|---|---|
| 5,710,765 | A * | 1/1998 | Lee et al. ................... | 418/36 |
| 6,192,029 | B1 * | 2/2001 | Averbuch et al. ............ | 370/229 |
| 6,542,718 | B1 * | 4/2003 | Kuo et al. ................... | 455/69 |
| 6,657,949 | B1 * | 12/2003 | Jones et al. ................. | 370/205 |
| 7,031,616 | B2 * | 4/2006 | Eilenberger et al. ......... | 398/155 |
| 7,085,849 | B1 * | 8/2006 | Clark et al. ................. | 709/234 |
| 2002/0154620 | A1 * | 10/2002 | Azenkot et al. ............. | 370/347 |
| 2005/0232633 | A1 * | 10/2005 | Haxell et al. ............... | 398/75 |

OTHER PUBLICATIONS

I. Saniee et al., "A New Optical Network Architecture that Exploits Joint Time and Wavelength Interleaving," IEEE/OFC Technical Digest, Feb. 2004.
K. Ross et al., "Scheduling Bursts in Time-Domain Wavelength Interleaved Networks," IEEE Journal on Selected Areas in Communications, vol. 21, No. 9, pp. 1441-1451, Nov. 2003.
I. Widjaja et al., "Light Core and Intelligent Edge for a Flexible, Thin-Layered and Cost-Effective Optical Transport Network," IEEE Communications Magazine, pp. 2-9, May 2003.
D. Katabi et al., "Congestion Control for High Bandwidth-Delay Product Networks," ACM Sigcomm, 14 pages, 2002.

* cited by examiner

*Primary Examiner*—Melvin Marcelo

(57) ABSTRACT

Flow control techniques are disclosed for use in data communications networks such as those implementing a time-domain wavelength interleaved network (TWIN) architecture or other suitable architectures. Such techniques may provide for congestion management and scheduling for asynchronous traffic. For example, in one aspect, a technique comprises collecting information at a node of an optical-based communications network, wherein at least a portion of the collected information pertains to congestion in the optical-based communications network, and adjusting a transmission rate of the node in response to at least a portion of the collected information such that the node operates under a substantially stable transmission schedule with respect to asynchronous data bursts. The transmission rate adjusting step/operation may further comprise adjusting the transmission rate such that the node operates under a substantially fair transmission schedule. The node may operate under a random transmission schedule.

20 Claims, 4 Drawing Sheets

---

$f^{700}$

Algorithm 1 Feedback-based burst allocation algorithm for congestion control at source $i$

- Initialization: $r_{i,j} = 0, \forall j$.
- At the $k$-th control timeout, set $d_{i,j}(k) = d_j^w(Q_i(kB_i)) + r_{i,j}(k)$, where $r_{i,j}(k)$ is obtained according to the following table, for fixed constants $\alpha, \beta$.

| | CASE | $r_{i,j}(k)$ |
|---|---|---|
| (1) | $y_{i,j}(k) > 0$ and $c_{i,j}(k) \geq a_{i,j}(k)$ | $r_{i,j}(k-1) - \max\{\alpha, \beta y_{i,j}(k)\}$ |
| (2) | $y_{i,j}(k) > 0$ and $c_{i,j}(k) < a_{i,j}(k)$ | $r_{i,j}(k-1) + \max\{\alpha, \beta y_{i,j}(k)\}$ |
| (3) | $y_{i,j}(k) \leq 0$ | $r_{i,j}(k-1) + \max\{\alpha, -\beta y_{i,j}(k)\}$ |

Since $d_{i,j}$ is constrained by the number of available bursts for transmission, we additionally restrict $$0 \leq d_{i,j}(k+1) \leq X_{i,j}(kB).$$

FIG. 3

| TIME SLOT n | 1 | 2 | 3 | 4 | 5 | 6 | 7 | 8 | 9 | 10 |
|---|---|---|---|---|---|---|---|---|---|---|
| SOURCE 1 SENDS BURST TO DESTINATION | 2 |  | 3 | 3 | 2 |  | 2 | 3 |  |  |
| SOURCE 2 SENDS BURST TO DESTINATION | 3 | 3 | 3 |  |  | 1 | 3 |  |  |  |
| DESTINATION 3 RECEIVES BURST FROM SOURCE |  |  | 2 | 1,2 | 1,2 |  |  |  | 1,2 |  |

FIG. 4

| TIME SLOT n | 1 | 2 | 3 | 4 | 5 | 6 | 7 | 8 | 9 | 10 |
|---|---|---|---|---|---|---|---|---|---|---|
| DESTINATION 1 SCHEDULES BURST FROM SOURCE | 2 |  | 3 | 3 | 2 |  | 2 | 3 |  |  |
| DESTINATION 2 SCHEDULES BURST FROM SOURCE | 3 | 3 | 3 |  |  | 1 | 3 |  |  |  |
| SOURCE 3 HAS BURST SCHEDULED TO DESTINATION |  |  | 2 | 1,2 | 1,2 |  |  |  | 1,2 |  |
| SOURCE 3 HAS RESOLVED TRANSMISSION TO DESTINATION |  | 2 |  | 2 | 1 |  |  |  |  | 2 |

| TIME SLOT $n$ | 1 | 2 | 3 | 4 | 5 | 6 | 7 | 8 |
|---|---|---|---|---|---|---|---|---|
| SOURCE 2 SENDS BURST TO DESTINATION | 1 | 1 | 1 | 1 | 1 | 1 | 1 | 1 |
| SOURCE 3 SENDS BURST TO DESTINATION | 1 | 1 | 1 | 1 | 1 | 1 | 1 | 1 |
| DESTINATION 1 RECEIVES BURST FROM SOURCE | 2,3 | 2,3 | 2,3 | 2,3 | 2,3 | 2,3 | 2,3 | 2,3 |

FIG. 7

Algorithm 1 Feedback-based burst allocation algorithm for congestion control at source $i$

- Initialization: $r_{i,j} = 0$, $\forall j$.
- At the $k$-th control timeout, set $d_{i,j}(k) = d_j^w(Q_i(kB_i)) + r_{i,j}(k)$, where $r_{i,j}(k)$ is obtained according to the following table, for fixed constants $\alpha$, $\beta$.

| | CASE | $r_{i,j}(k)$ |
|---|---|---|
| (1) | $y_{i,j}(k) > 0$ and $c_{i,j}(k) \geq a_{i,j}(k)$ | $r_{i,j}(k-1) - \max\{\alpha, \beta y_{i,j}(k)\}$ |
| (2) | $y_{i,j}(k) > 0$ and $c_{i,j}(k) < a_{i,j}(k)$ | $r_{i,j}(k-1) + \max\{\alpha, \beta y_{i,j}(k)\}$ |
| (3) | $y_{i,j}(k) \leq 0$ | $r_{i,j}(k-1) + \max\{\alpha, -\beta y_{i,j}(k)\}$ |

Since $d_{i,j}$ is constrained by the number of available bursts for transmission, we additionally restrict $$0 \leq d_{i,j}(k+1) \leq X_{i,j}(kB).$$

FIG. 8

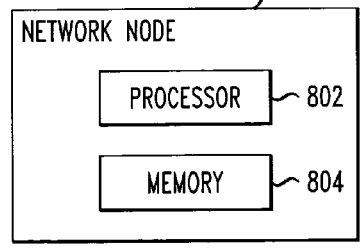

FLOW CONTROL AND CONGESTION MANAGEMENT FOR RANDOM SCHEDULING IN TIME-DOMAIN WAVELENGTH INTERLEAVED NETWORKS

FIELD OF THE INVENTION

The present invention generally relates to data communications networks and, more particularly, to techniques for flow control and congestion management for random scheduling in data communications networks such as time-domain wavelength interleaved networks.

BACKGROUND OF THE INVENTION

The increasing dominance of data traffic in the Internet is pushing network service providers to deploy complex network architectures with sophisticated new optical components for exploiting the tremendous capacity of optical fiber. The fundamental enabling technology is wavelength division multiplexing (WDM), whereby multiple data streams are simultaneously transmitted on distinct wavelength channels. Tunable components such as optical switches, tunable transceivers, and tunable filters have been made cost effective in recent years. These components introduce configurability into networks, enabling network architects to envision and study practical means of deploying automatically-controlled dynamic optical networks.

The Time-domain Wavelength Interleaved Networking (TWIN) architecture has been introduced as an efficient and cost-effective alternative to both Optical Circuit Switching and Optical Burst Switching, see, e.g., I. Saniee et al., "A New Optical Network Architecture that Exploits Joint Time and Wavelength Interleaving," IEEE/OFC Technical Digest, February 2004, the disclosure of which is incorporated by reference herein. TWIN utilizes fast tunable lasers and burst-mode receivers at the network edge, and wavelength selective cross-connect (WSXC) for passive routing of optical signals (bursts) in the network core.

Typically, in the TWIN architecture, propagation delays (e.g., about 1 millisecond per 200 kilometers) significantly dominate the scheduling time-scale (on the order of tens of microseconds) and thus are non-negligible. Thus, for a nearly static load, pre-computed centralized scheduling is feasible, e.g., as described in K. Ross et al., "Scheduling Bursts in Time-domain Wavelength Interleaved Networks," IEEE J. Select. Areas Comm., vol. 21, pp. 1441-1451, November 2003, the disclosure of which is incorporated by reference herein.

SUMMARY OF THE INVENTION

Principles of the present invention provide flow control and congestion management techniques for use in data communications networks such as those implementing a time-domain wavelength interleaved network (TWIN) architecture or other suitable architectures. Since, for asynchronously varying traffic, the propagation delays for a centralized scheduler may be unacceptably large, techniques are provided for flow control and congestion management in accordance with scheduling of asynchronous traffic in TWIN architectures or other suitable architectures.

For example, in one aspect, a technique comprises collecting information at a node of an optical-based communications network, wherein at least a portion of the collected information pertains to congestion in the optical-based communications network, and adjusting a transmission rate of the node in response to at least a portion of the collected information such that the node operates under a substantially stable transmission schedule with respect to asynchronous data bursts. The transmission rate adjusting step/operation may further comprise adjusting the transmission rate such that the node operates under a substantially fair transmission schedule. The node may also operate under a random transmission schedule.

In one illustrative embodiment, the information collecting step/operation may further comprise collecting, for a given control interval: (i) feedback information representing the number of collisions that occurred with respect to transmissions of data bursts by the node previous to the given control interval; (ii) information representing the number of data bursts received by the node from one or more other nodes in the network in the given control interval; and (iii) information representing the number of data bursts transmitted by the node before the given control interval over a time period equivalent to a round trip propagation delay between the node and a given destination node in the network.

Further, the technique may comprise computing a data burst allocation indicator from the collected information, wherein the data burst allocation indicator may be a local estimate representing how well collisions are serviced by the transmission schedule of the node.

Still further, in an illustrative embodiment, the transmission rate adjusting step/operation may further comprise: (i) decreasing the transmission rate when the data burst allocation indicator is greater than a given threshold value (e.g., zero) and the number of collisions that occurred with respect to transmissions of data bursts by the node previous to the given control interval is greater than or equal to the number of data bursts received by the node from one or more other nodes in the network in the given control interval; (ii) increasing the transmission rate when the data burst allocation indicator is greater than a given threshold value and the number of collisions that occurred with respect to transmissions of data bursts by the node previous to the given control interval is less than the number of data bursts received by the node from one or more other nodes in the network in the given control interval; and (iii) increasing the transmission rate when the data burst allocation indicator is less than or equal to a given threshold value and the number of collisions that occurred with respect to transmissions of data bursts by the node previous to the given control interval is equal to the number of data bursts received by the node from one or more other nodes in the network in the given control interval.

Also, the information collecting step/operation and the transmission rate adjusting step/operation may be performed, for the given control interval, for one or more node pairs formed by the node and one or more destination nodes in the network. Also, in an illustrative embodiment, the optical-based communications network is a time-domain wavelength interleaved network (TWIN).

Furthermore, in another aspect, a technique comprises collecting information at a node of a time-domain wavelength interleaved network, wherein at least a portion of the collected information pertains to congestion in the network, and scheduling, at the node, transmission of asynchronous data bursts from the node in response to at least a portion of the collected information. The scheduling step/operation may comprise a random transmission schedule.

Advantageously, embodiments are able to provide traffic flow control and congestion management under the TWIN architecture or other suitable architectures such that distributed scheduling for servicing asynchronously varying data streams is provided.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating randomly scheduled burst transmissions for a single control interval under source-based scheduling, according to an embodiment of the invention;

FIG. 4 is a diagram illustrating randomly scheduled burst transmissions for a single control interval under destination-based scheduling, according to an embodiment of the invention;

FIG. 7 is a diagram illustrating a flow control and congestion management algorithm, according to an embodiment of the invention; and FIG. 8 is a diagram illustrating an implementation of a network node, according to an embodiment of the invention.

DETAILED DESCRIPTION OF THE INVENTION

The invention will be illustrated herein in conjunction with illustrative embodiments of a Time-domain Wavelength Interleaved Networking (TWIN) architecture. It should be understood, however, that the invention is not limited to use with the illustrative TWIN embodiments described, but is instead more generally applicable to any suitable network architectures in which it would be desirable to provide flow control and congestion management techniques for servicing asynchronous traffic.

As used herein, the terms "internal" and "external" (or "exogenous") are generally from the perspective of the scheduler of the node under consideration.

Figure 1:
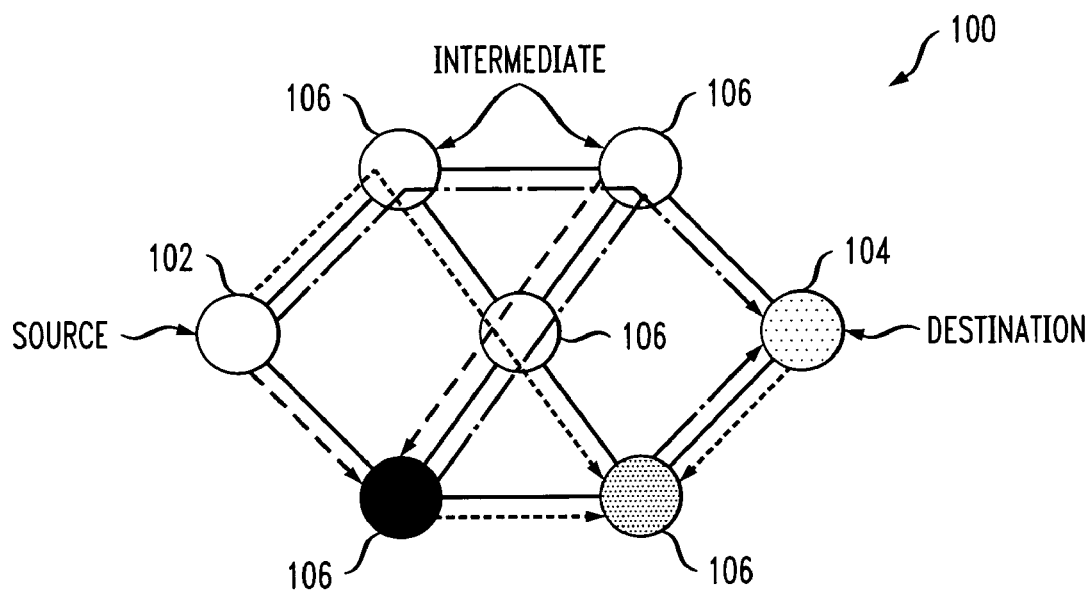
FIG. 1 is a diagram illustrating a time-domain wavelength interleaved networking architecture in accordance with which techniques of the invention may be employed.

A simple example of a TWIN architecture 100 is shown in FIG. 1. It is assumed that each source node is equipped with a fast tunable laser and each destination is assigned a unique (set of) wavelength(s). When a source node, e.g., 102, has data to send to a destination node, e.g., 104, the source node tunes its laser to the wavelength assigned to that destination node for the duration of the data transmission.

Each intermediate node, e.g., 106, performs self-routing of optical bursts without buffering to the intended destination based solely on the wavelength of the burst. Self-routing is effected through use of wavelength selective cross-connects (WSXCs). No label/address lookup processing is needed in forwarding bursts from one node to another, thereby making the network core transparent and simple. The intermediate nodes are pre-configured so that any incoming optical signal of a given wavelength will be routed to the appropriate destination. One example is to pre-configure the routes that form an optical multipoint-to-point tree for each destination, as shown in FIG. 1.

It is to be appreciated that each node in the network, for a given data transmission, can function as a source node, a destination node, or an intermediate node.

It has been realized that, for asynchronously varying traffic in the TWIN environment, propagation delays for a centralized scheduler may be unacceptably large. Therefore, present embodiments consider network control from a distributed scheduling standpoint, where all scheduling and flow control may be performed for each node independently and on a separate control channel.

More particularly, present embodiments provide distributed flow control algorithms for servicing asynchronous traffic in the TWIN environment. The algorithms may provide for: (a) congestion management for flow control of burst transmissions; and (b) random scheduling for medium access control (MAC) over the WDM layer.

Figure 2:
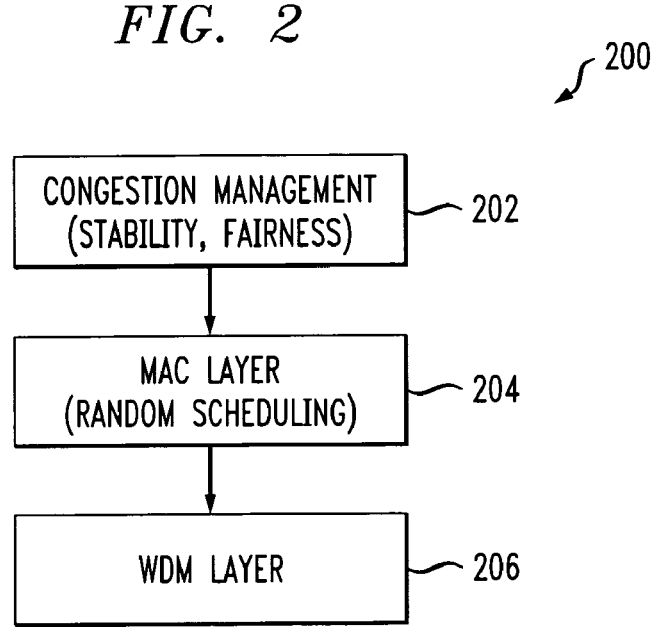
FIG. 2 is a diagram illustrating layers of a thin-layered time-domain wavelength interleaved networking architecture in accordance with which techniques of the invention may be employed.

Such functions of the distributed flow control algorithms of the present embodiments may be effected through a thin-layered TWIN architecture. An example of a thin-layered TWIN architecture 200 is shown in FIG. 2. As shown, architecture 200 includes a congestion management layer 202, a MAC layer 204 where random scheduling is performed, and a WDM layer 206.

TWIN makes use of multiple wavelengths, each of which may be used to transmit to different nodes at any given instant in time, with collisions occurring if multiple nodes access the same wavelength at the same instant. The present approach provides distributed, robust algorithms for achieving network stability under a broad class of dynamic traffic demands. The algorithms make use of feedback for dynamically adjusting to changing traffic and congestion in the network. The algorithms have no knowledge of the traffic statistics, and are stable over a large set of rates. Furthermore, a fairness mechanism is built into the algorithms to eliminate problems of starvation to flows having low arrival rates.

The remainder of the detailed description will be divided into the following sections. In Section I, an illustrative network model is explained. In Section II, random distributed scheduling techniques in a TWIN environment, including source-based and destination-based schedulers, are explained. In Section III, illustrative flow control techniques are explained. In Section IV, an illustrative implementation of a network node for use in a TWIN environment is explained.

I. Network Model and Definitions

It is assumed that the system operates in slotted time, indexed by integer $n \geq 0$. Each data unit, or burst is assumed to have duration of a single slot, i.e., a node launches the data corresponding to a single burst onto a single lightpath over a single slot. There are N nodes in the network, labeled 1, ..., N, with the light tree corresponding to node i arbitrarily assigned to wavelength i, i=1, ..., N. Bursts are stored in virtual output queues (VOQ's), with the VOQ at source i containing bursts to be transmitted to destination j stored in $VOQ_{i,j}$. Let $Q_{i,j}(n)$ be the number of unscheduled bursts in $VOQ_{i,j}$ at time n, and $Q(n)=(Q_{i,j}(n), i, j=1, ..., N)$. A deterministic initial state, $Q(0)$, is assumed.

The link transmission delays are stored in matrix $\delta=(\delta_{i,j}, i, j=1, ..., N)$, where $\delta_{i,j}$ equals the transmission delay along the light tree linking source node i to destination node j. These delays are incurred by both data and control transmissions. For simplicity, it is assumed that $\delta$ is an integer matrix. This assumption does not detract from the analysis, and can certainly be relaxed, though non-integer transmission delays will have an impact on the maximum throughput of the network.

The exogenous arrival process, $$\{A(n)\}_{n=0}^{\infty},$$

is defined such that $A_{i,j}(n)$ is the cumulative number of exogenous arrivals to $VOQ_{i,j}$ by time n, and satisfies a strong law of large numbers property:

$$T \xrightarrow{\lim} \infty \frac{A_{i,j}(T)}{T} = \lambda_{i,j}. \quad (1)$$

$\lambda_{i,j}$ is called the exogenous arrival rate to $VOQ_{i,j}$. These arrival rates are collected into matrix $\lambda=(\lambda_{i,j}, i,j=1, \ldots, N)$.

II. Random Scheduling for Medium Access Control

For medium access control (MAC), random scheduling is employed. This implies that different nodes may occasionally transmit bursts that collide at a particular destination. In this case, collided bursts are assumed to be lost and retransmission is required. Burst acknowledgments are assumed to be relayed using acknowledgment/no-acknowledgment (ACK/NAK) messages, with messages sent immediately upon successful transmission or collision. Alternatively, a source can assume a collision if it does not receive an ACK within a timeout. Control information is passed on a dedicated wavelength channel employing TDM or another collision-free scheme. Thus, there is no need to be concerned about contention for the control channel resources. In this section, two random scheduling schemes underlying a flow control algorithm are outlined, namely, source-based scheduling and destination-based scheduling.

The system operates using deterministic control intervals, possibly different at each scheduler. At the beginning of a control interval, a scheduler makes a decision about which bursts to transmit over the duration of the control interval. Since the round-trip times are fixed and known (according to matrix $\delta$), the control interval used by a source (in source-based scheduling) or a destination (in destination-based scheduling) may be set at some value dependent on the delays in receiving feedback for that source or destination.

There is a trade-off from using different control interval durations: shorter control intervals imply increased responsiveness and lower service delays, while incurring higher computational complexity per unit time. The control intervals should also account for the TWIN cycle time, which is a fixed cycle duration over which transmissions should be scheduled, see, e.g., I. Widjaja et al. "Light Core and Intelligent Edge for a Flexible, Thin-layered and Cost-effective Optical Transport Network," IEEE Commun. Mag., vol. 41, pp. S30-S36, May 2003, the disclosure of which is incorporated by reference herein. In terms of implementation, a convenient approach will be to keep the control intervals equal to an integer number of cycle times.

A. Source-Based Scheduler

For source i, it is assumed that the control interval is set to the constant value $B_i$. Under source-based scheduling, at a control decision instant, source i makes an independent decision about how many bursts to transmit to each destination node over the duration of the next control interval. These values are stored in vector $d_i=(d_{i,j}=1, \ldots, N)$. The manner in which $d_i$ is chosen follows from the flow control algorithm, and is presented below in Section III. Since the source obtains a schedule for all destinations, it must be true that $\Sigma_j d_{i,j} \leq B_i$.

Source i then randomly allocates $d_{i,j}$ bursts over the slots of the control interval for all j, with no slot assigned more than one burst. To clarify the source-based scheduler, an example is now provided.

Consider a network with N=3 nodes, and control decision interval B=8 at each node. It is assumed that the control decision intervals are aligned, meaning that each node schedules bursts at the same time. Suppose that the source-based scheduler at node 1 decides to transmit $d_{1,2}=3$ and $d_{1,3}=3$ bursts to destination nodes 2 and 3, respectively, over the upcoming control interval. Similarly, suppose source node 2 decides to transmit $d_{2,1}=1$ and $d_{2,3}=4$ bursts to its destinations. Suppose that nodes 1 and 2 independently allocate these bursts over their control intervals, with allocation shown in FIG. 3. For transmission delays $\delta_{1,3}=1$ slot and $\delta_{2,3}=2$ slots, the table in FIG. 3 shows how the bursts arrive at destination node 3, with collisions suffered at time slots 4, 5, and 9.

A system equation is now provided for the queue dynamics under source-based scheduling. The burst transmission process, $$\{D_i(n)\}_{n=0}^{\infty},$$

is defined with $D_i(n)=(D_{i,j}(n), j=1, \ldots, N)$, such that $D_{i,j}(n)$ is the cumulative number of bursts whose departure was scheduled to occur up to time n from $VOQ_{i,j}$. There is also an internal arrival process, which counts the number of NAKs received, each requiring retransmission of a burst that has suffered a collision. This arrival process, $$\{C_i(n)\}_{n=0}^{\infty},$$

is defined with $C_i(n)=(C_{i,j}(n), j=1, \ldots, N)$, such that $C_{i,j}(n)$ is the cumulative number of bursts from $VOQ_{i,j}$ whose transmission resulted in a collision up to time $n-\delta_{i,j}-\delta_{j,i}$. The time offset occurs because by time n, all feedback information about transmitted packets has been received, except for those packets that were transmitted in the most recent round trip time. Setting $A_i(n)=(A_{i,j}(n), j=1, \ldots, N)$, the backlog vector of bursts awaiting scheduling at node i, $$\{Q_i(n)\}_{n=0}^{\infty},$$

may then be described by:

$$Q_i(n)=Q_i(0)+A_i(n)+C_i(n)-D_i(n). \quad (2)$$

It will be useful to consider the differential variable $d_i(n)=(d_{i,j}(n), j=1, \ldots, N)$, where:

$$d_{i,j}(n)=D_{i,j}(nB_i)-D_{i,j}((n-1)B_i).$$

Here, $d_{i,j}(n)$ is the total number of departures scheduled by node i to node j over the n-th control interval of node i.

B. Destination-Based Scheduler

The destination-based scheduler is designed to eliminate the collisions suffered under source-based scheduling. For destination j, a control interval of duration $B_j$ is assumed. It is assumed that sources use the control channel to provide regular updates of their VOQ backlogs (service demands) to their respective destinations. At a control decision instant, destination j calculates for each source the number of bursts that the source should transmit to j over the duration of the next control interval, $d_{i,j}$. These values are gathered into vector $d_j=(d_{i,j}, i=1,\ldots,N)$. Destination j then randomly allocates the $d_{i,j}$ bursts for all i over the $B_j$ control interval slots, and returns the slot schedules to the sources.

Since each source receives slot schedules from all destinations, it is possible that more than one destination has scheduled a source for transmission at a particular slot. The source has an opportunity to resolve this conflict of schedules, by selecting one of the conflicting destinations and transmitting to that one. The other destination(s) is(are) sent a NAK. For simplicity, it is assumed that each clash is resolved by randomly selecting one of the conflicting destinations for transmission. To further clarify the destination-based scheduler, an example is now provided.

Consider a network with N=3 nodes, and a control interval of B=8 slots at each destination (these intervals are aligned). Suppose node 1 chooses $d_{2,1}=3$ and $d_{3,1}=3$, and node 2 chooses $d_{1,2}=1$ and $d_{3,2}=4$. The network is subject to delays $\delta_{1,3}=1$ and $\delta_{2,3}=2$ for returning the schedules created at each destination to source 3. The table in FIG. 4 shows the allocation of burst transmissions to slots made by the destination-based schedulers at nodes 1 and 2, followed by the conflict resolution at source node 3, resulting in the actual transmissions made by node 3. As opposed to the source-based case, the destination-based scheduler has managed to successfully transmit a single burst on each of slots 4, 5, and 9.

A system equation for the queue dynamics is defined from the perspective of the destination-based scheduler. Namely, arrivals are counted when a destination becomes aware of the new traffic demand. The same goes for internal arrivals due to conflicts at source nodes. The cumulative arrival process $$\{A_j(n)\}_{n=0}^{\infty}$$

is now defined with $A_j(n)=(A_{i,j}(n), i=1,\ldots,N)$, such that $A_{i,j}(n)$ is the cumulative number of exogenous arrivals at source i's $VOQ_{i,j}$ that have been made known to destination j.

In other words, $A_{i,j}(n)$ is the cumulative number of arrivals to $VOQ_{i,i}$ by time $n-\delta_{i,j}$. The burst transmission process, $$\{D_j(n)\}_{n=0}^{\infty},$$

is defined with $D_j(n)=(D_{i,j}(n), i=1,\ldots,N)$, such that $D_{i,j}(n)$ is the cumulative number of bursts that destination j has scheduled for source i by time n. Finally, the internal arrival process, $$\{C_j(n)\}_{n=0}^{\infty},$$

is defined with $C_j(n)=(C_{i,j}(n), i=1,\ldots,N)$, such that $C_{i,j}(n)$ is the cumulative number of bursts from source i to destination j that were scheduled but not transmitted by source i due to a collision of schedules at the source, up to time $n-\delta_{i,j}$, $-\delta_{i,j}$.

Again, the time offset occurs because of the delay time in transmitting the schedule to the source, and the delay in transmission time of packets from the source to the destination. Thus, the backlog vector of bursts known to destination j and awaiting scheduling, $$\{Q_j(n)\}_{n=0}^{\infty}$$

may be described by:

$$Q_j(n)=Q_j(0)+A_j(n)+C_j(n)-D_j(n). \quad (3)$$

Again, the differential variable $d_j(n)$ is defined as $(d_{i,j}(n), i=1,\ldots,N)$, where $$d_{i,j}(n)=D_{i,j}(nB_j)-D_{i,j}((n-1)Bj).$$

In this case, $d_{i,j}(n)$ is the total number of burst transmissions scheduled by destination node j for source i over the n-th control interval of node j.

C. Stability

The notion of stability that we seek in one embodiment is referred to as weak stability. The network is deemed stable if the long-term rate of arrivals (external and internal) equals that of attempted transmissions. Mathematically, stability is implied if $$\lim_{T\to\infty}\left(\frac{A_{i,j}(T)}{T}+\frac{C_{i,j}(T)}{T}-\frac{D_{i,j}(T)}{T}\right)=0, \forall\, i, j.$$

III. Flow Control and Congestion Management for Stability

As described in the previous sections, the distributed scheduling environment requires the use of feedback for demanding retransmissions upon collisions (under source-based scheduling) or conflicts (under destination-based scheduling). A collision/conflict may be an indication that there is too much competition for a particular resource (destination/source). Alternatively, it may simply be random coincidence of two scheduled bursts on an otherwise relatively unused resource. Thus, there is a need for congestion management in the network, where persistent collision/conflict feedback information dynamically triggers changes in the scheduling decisions at each node.

The present embodiment provides a flow control mechanism to regulate the rates of transmission based on feedback about congestion in the network. This flow control mechanism aims to achieve fairness and stability. The TWIN architecture provides several important features that simplify the flow control algorithm of the present embodiments:

1) Explicit traffic information for each source-destination pair is collected, in the form of external/internal arrivals and successful transmissions.
2) No network interference, since there are no intermediate nodes. Thus, congestion is only experienced at the edge nodes.
3) Link propagation delays are known, which allows us to fix the control interval durations at constant values.

Embodiments of the network architecture are also advantageous in that no congestion windows are used (as are necessary in D. Katabi et al., "Congestion Control for High Bandwidth-delay Product Networks," ACM Sigcomm, 2002, the disclosure of which is incorporated by reference herein), and internal arrivals due to failed transmission attempts result in retransmission requirements. Nevertheless, we do wish to incorporate fairness into our allocation of throughput between the competing flows at each node. Further, we do want to manipulate the number of burst transmissions attempted for each source-destination pair at each control interval according to a congestion control mechanism. Finally, the algorithm should operate under unknown arrival rates, automatically adjusting its transmission rates according to the queue dynamics.

The flow control mechanism of the present embodiment is based on manipulation of the differential departure processes $$\{d_i(n)\}_{n=1}^{\infty},$$

$i=1, \ldots, N$. The discussions in this section apply under both source and destination-based scheduling. However, for the sake of simplicity, the remainder of this section details the scheduling algorithm assuming a source-based scheduler.

A. Incorporating Fairness

An important design goal is to build a scheduler that chooses a fair allocation of bursts at each control decision instant, subject to the stability of the scheduler. Fair scheduling will help to mitigate starvation of service to VOQ's with low arrival rates. For our scheduler, we consider max-min fairness.

At source node i, suppose that the queue backlog vector is given by $Q_i=(Q_{i,j}, j=1, \ldots, N)$. Then, the fair allocation of bursts over a control interval of duration $B_i$ slots is given by vector $d^w(Q_i)$, where:

$$d^w(Q_i) = \arg\max_d e'd \quad (5)$$

$$\text{subject to } \sum_{j=1}^{N} d_j \leq B_i \quad (6)$$

$$d_j = \min\{m, Q_{i,j}\}, \forall j \quad (7)$$

$$m \geq 0. \quad (8)$$

Clearly, the above expression needs to be adjusted to yield integer-valued vector $d^w(Q_i)$.

Figures 5, 6:
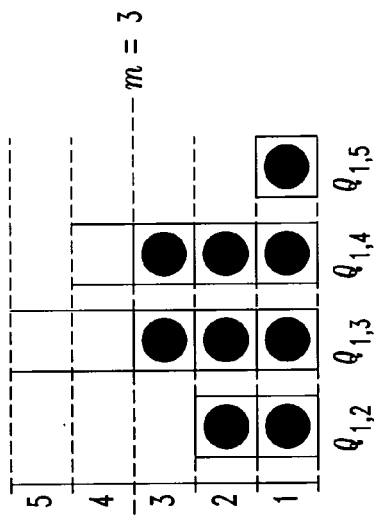
FIG. 5 is a diagram illustrating max-min fair allocation.
FIG. 6 is a diagram illustrating burst transmissions and resulting collisions for a single source-based scheduling interval under pure fair scheduling.

Consider the source-based scheduler at node 1, with $B_1=9$ slots, and VOQ backlog vector $Q_1=(Q_{1,2}=2, Q_{1,3}=5, Q_{1,4}=4, Q_{1,5}=1)$. A simple way of graphically determining the max-min fair schedule is to associate with $VOQ_{1,j}$ a bowl of height $Q_{1,j}$ (where the height corresponds to number of bursts). Then, there is a maximum value m such that for each $VOQ_{1,j}$ either m or $Q_{1,j}$ bursts are allocated to the bowl, whichever is smaller, and the total number of bursts allocated over all bowls does not exceed $B_1$. $d^w(Q_1)=(2, 3, 3, 1)$ are obtained, as shown in FIG. 5.

Since fair scheduling is a major design objective, we could design our distributed scheduler to employ pure fair scheduling, by assigning $d_i(n+1)=d^w(Q_i(nB_i))$. In words, over the n-th control interval, the scheduler at node i (source or destination-based) attempts transmission according to the max-min fair schedule corresponding to its queue backlog vector at the beginning of the control interval. There are cases under which the pure fair scheduler leads to network instability, even at arbitrarily low system loads. We demonstrate this result next. Let $a_0=\max\{B_i+\delta_{i,k}+\delta_{k,i}, B_j+\delta_{j,k}+\delta_{k,j}\}$.

The pure fair scheduler, which assigns $d_i(n+1)=d^w(Q_i(nB_i))$ is unstable at arbitrarily low system loads, when only a single destination, k, has nonzero arrival rates, and there is nonzero probability that at some time slot two distinct nodes i,j, i≠j, have VOQ backlogs $Q_{i,k} \geq B_i+a_0$ and $Q_{j,k} \geq B_j+a_0$.

Let $\lambda_{i,k}>0$ and $\lambda_{j,k}>0$, with all other VOQ's having zero arrivals for all time. Consider any sample path that results in VOQ backlogs $Q_{i,k}(n_0) \geq B_i+a_0$ and $Q_{j,k}(n_0) \geq B_j+a_0$ for some time $n_0$. Then it is guaranteed that $a_0$ slots later, nodes i and j have both entered new control intervals, the bursts from those control intervals are beginning to collide, and feedback about these collisions is arriving to the source nodes. Since neither node i or j has bursts awaiting transmission to any node other than k, both schedulers transmit on every slot starting at their next respective control decision instants after time $n_0$. Since every slot is transmitted on by both schedulers, every burst is in conflict after time slot $a_1=n_0+\max\{B_i+\delta_{i,k}, B_j+\delta_{j,k}\}$. The nonzero arrival rates at $VOQ_{i,k}$ and $VOQ_{j,k}$ assures that with probability one, $Q_{i,k}(n) \to \infty$ and $Q_{j,k}(n) \to \infty$ as $n \to \infty$, with no successful departures from either queue after time $a_1$. Thus, the system is unstable.

Consider a network of N=3 nodes, with control interval duration B=8 for all nodes. Let $\delta_{i,j}=0, \forall_{i,j}$ and initial queue occupancies of $Q_{2,1}(0)=8$, $Q_{3,1}(0)=8$, and $Q_{i,j}(0)=0$ otherwise. Suppose $\lambda_{2,1}>0$ and $\lambda_{3,1}>0$, and $A_{i,j}(n)=0$ for all other VOQ's and all n (i.e. no arrivals to other VOQ's). The table in FIG. 6 shows the departures from nodes 2 and 3 and resulting collisions at node 1 under pure fair scheduling. Since nodes 2 and 3 only have bursts for node 1, they schedule their entire control interval with bursts for node 1, resulting in a collision rate of 100%. Since nodes 2 and 3 have nonzero arrival rates of bursts destined to node 1, the backlogs at these nodes must tend to infinity.

The above result demonstrates that pure fair scheduling is severely inadequate in serving otherwise very easily scheduled traffic. Thus, we conclude that a distributed scheduling algorithm should incorporate a mechanism to maintain stability under unknown arrival rates while striving for a fair schedule. This is an impetus behind the congestion management algorithm of the present embodiment.

B. Flow Control and Congestion Management Algorithm

We now formulate a flow control and congestion management algorithm, which operates together with a fair scheduling mechanism to achieve desirable stability properties. FIG. 7 illustrates such a flow control and congestion management algorithm 700, according to an embodiment of the invention.

Over a control interval, each scheduler collects feedback information about previously scheduled bursts. Given this feedback, and memory about the corresponding external arrivals and attempted transmissions, each node will have an effective means of adjusting its rates in response to the feedback information.

The key variables of interest at the n-th control decision instant are: the number of collision feedbacks received about $VOQ_{i,j}$ transmissions over the past control interval $c_{i,j}(n)=C_{i,j}(nB_i)-C_{i,j}((n-1)B_i)$, which is gathered into vector $c_i(n)$; the departures corresponding to the collision feedback data $d_{i,j}^c(n)=D_{i,j}(nB_i-\delta_{i,j}-\delta_{j,i})-D_{i,j}((n-1)B_i-\delta_{i,j}-\delta_{j,i})$; the current external arrival information, $a_{i,j}(n)=A_{i,j}(nB_i)-A_{i,j}((n-1)B_i)$.

The instability incurred by pure max-min fairness necessitates a flow control and congestion management mechanism that relies on persistent feedback information to adjust burst allocations for source destination pairs at each control timeout. Consequently, we design our controller such that on the k-th control timeout at source i:

$$d_i(k+1)=d^w(Q_i(kB_i))+r_i(k+1). \quad (9)$$

The process $$\{r_{i,j}(k)\}_{k=1}^{\infty}$$

acts as a regulator on the max-min fair schedule, to achieve queue backlog stability at node i.

Upon the k-th control timeout at source i, our feedback-based algorithm obtains for each destination j the value:

$$y_{i,j}(k)=a_{i,j}(k)+c_{i,j}(k)-d_{i,j}^c(k). \quad (10)$$

where $a_{i,j}(k)$ are the exogenous arrivals over the k-th frame, $c_{i,j}(k)$ are the internal arrivals over the k-th frame, and $d_{i,j}^c(k)$ is the number of attempted transmissions, i.e., for attempts that resulted in $c_{i,j}(k)$, viz. $d_{i,j}^c(n)=D_{i,j}(nB_i-\delta_{i,j}-\delta_{j,i})-D_{i,j}((n-1)B_i-\delta_{i,j}-\delta_{j,i})$.

The term $y_{i,j}(k)$ is thus a local estimate of how well external and internal arrivals (from clashes) are serviced by the burst allocation.

That is, in general, $y_{i,j}(k)$ serves as a burst allocation indicator and is computed, for a given control interval, from: (i) $c_{i,j}(k)$ which may generally be considered as feedback information representing the number of collisions that occurred with respect to transmissions of data bursts by the node previous to the given control interval; (ii) $a_{i,j}(k)$ which may generally be considered information representing the number of data bursts received by the node from one or more other nodes in the network in the given control interval; and (iii) $d_{i,j}^c(k)$ which may generally be considered as information representing the number of data bursts transmitted by the node before the given control interval over a time period equivalent to a round trip propagation delay between the node and a given destination node in the network.

The algorithm, as shown in FIG. 7, considers three possible cases at each control interval and modifies the max-min fair burst allocation in response to these cases.

Case 1 indicates that too many clashes are resulting in the inability of the scheduler to service its total exogenous and internal arrivals, and thus the number of bursts allocated should be reduced to incur fewer clashes. That is, as indicated in FIG. 7, the transmission rate is decreased when the data burst allocation indicator is greater than zero and $c_{i,j}(k)$ is greater than or equal to $a_{i,j}(k)$.

Case 2 indicates that the number of bursts allocated is insufficient to service the dominant exogenous arrivals, and thus should be increased to service this demand. That is, as indicated in FIG. 7, the transmission rate is increased when the data burst allocation indicator is greater than zero and $c_{i,j}(k)$ is less than $a_{i,j}(k)$.

Case 3 indicates that the burst allocation satisfies the exogenous and internal arrivals, and thus the number of bursts allocated should be increased to try to further improve the throughput of flow between nodes i and j. That is, as indicated in FIG. 7, the transmission rate is increased when the data burst allocation indicator is less than or equal to zero and $c_{i,j}(k)$ is equal to $a_{i,j}(k)$.

Further, as indicated in FIG. 7, the constant $\alpha>0$ is the minimum perturbation of $r_{i,j}$ from one control interval to the next, while $\beta>0$ is the proportionality constant relating $r_{i,j}$ to the local congestion measurement value, $y_{i,j}$. These constants are chosen to affect the responsiveness of the algorithm to the feedback. In one embodiment, we set $\alpha=1$, $\beta=1$; however, the invention is not limited thereto.

IV. Illustrative Network Node Implementation

FIG. 8 illustrates an implementation of a network node, according to an embodiment of the invention. More particularly, FIG. 8 illustrates network node 800, which may act as a source node, an intermediate node, and/or a destination node in a TWIN architecture (e.g., FIG. 1) or other suitable architecture. It is to be appreciated that one or more of the flow control methodologies of the embodiments described herein may be implemented via the computing system of network node 800. For example, algorithm 700 of FIG. 7 may be implemented in network node 800. Other types of node configurations may be used, as will be appreciated by those skilled in the art, and a given network may include many nodes with differing configurations.

Generally, as shown, node 800 is configured so as to include processor 802 coupled to memory 804. Processor 802 may comprise a microprocessor, a microcontroller, a central processing unit (CPU), an application-specific integrated circuit (ASIC) or other type of processing device, as well as portions or combinations of such devices. Memory 804 may include an electronic random access memory (RAM), a read-only memory (ROM) or other type of storage device, as well as portions or combinations of such devices. The memory may be used to store software that is executed by or otherwise utilized by the processor in implementing at least a portion of a flow control methodologies in accordance with the present embodiments.

Node 800 may be viewed as an example of what is more generally referred to herein as a "processing device." Such a processing device may be implemented in the form of one or more integrated circuits, as well as in the form of other types of hardware, software or firmware, in any combination.

It is to be appreciated that network 100 (FIG. 1) and node 800 in FIG. 8 are considerably simplified for purposes of illustration, and may include other elements, not explicitly shown. For example, node 800 may include a tunable transmitter and a burst-mode receiver so as to function as an edge (source/destination) node, and/or wavelength-selective cross-connects so as to function as an intermediate node. Also, node 800 may include conventional interfaces and/or protocols for transmitting data to, and receiving data from, one or more other nodes in the network.

The above-described embodiments of the invention are intended to be illustrative only. Numerous alternative embodiments within the scope of the following claims will be apparent to those skilled in the art.

We claim:

1. A method, comprising the steps of:
    collecting information at a node of an optical-based communications network, wherein at least a portion of the collected information pertains to congestion in the optical-based communications network;
    computing a data burst allocation indicator value from at least a portion of the collected information; and
    adjusting a transmission rate of the node in response to the data burst allocation indicator value such that the node operates under a stable transmission schedule with respect to asynchronous data bursts.

2. The method of claim 1, wherein the transmission rate adjusting step further comprises adjusting the transmission rate such that the node operates under a fair transmission schedule.

3. The method of claim 1, wherein the transmission rate adjusting step further comprises adjusting the transmission rate such that the node operates under a random transmission schedule.

4. The method of claim 1, wherein the optical-based communications network is a time-domain wavelength interleaved network.

5. A method, comprising the steps of:
collecting information at a node of an optical-based communications network, wherein at least a portion of the collected information pertains to congestion in the optical-based communications network; and
adjusting a transmission rate of the node in response to at least a portion of the collected information such that the node operates under a stable transmission schedule with respect to asynchronous data bursts;
wherein the information collecting step further comprises collecting, for a given control interval, feedback information representing the number of collisions that occurred with respect to transmissions of data bursts by the node previous to the given control interval.

6. The method of claim 5, wherein the information collecting step further comprises collecting, for a given control interval, information representing the number of data bursts received by the node from one or more other nodes in the network in the given control interval.

7. The method of claim 6, wherein the information collecting step further comprises collecting, for a given control interval, information representing the number of data bursts transmitted by the node before the given control interval over a time period equivalent to a round trip propagation delay between the node and a given destination node in the network.

8. The method of claim 7, further comprising the step of computing a data burst allocation indicator from the collected information.

9. The method of claim 8, wherein the data burst allocation indicator is a local estimate representing an indicator of collision servicing by the transmission schedule of the node.

10. A method, comprising the steps of:
collecting information at a node of an optical-based communications network, wherein at least a portion of the collected information pertains to congestion in the optical-based communications network;
adjusting a transmission rate of the node in response to at least a portion of the collected information such that the node operates under a stable transmission schedule with respect to asynchronous data bursts;
wherein the information collecting step further comprises collecting, for a given control interval, feedback information representing the number of collisions that occurred with respect to transmissions of data bursts by the node previous to the given control interval;
wherein the information collecting step further comprises collecting, for a given control interval, information representing the number of data bursts received by the node from one or more other nodes in the network in the given control interval;
wherein the information collecting step further comprises collecting, for a given control interval, information representing the number of data bursts transmitted by the node before the given control interval over a time period equivalent to a round trip propagation delay between the node and a given destination node in the network; and
computing a data burst allocation indicator from the collected information;
wherein the transmission rate adjusting step further comprises decreasing the transmission rate when the data burst allocation indicator is greater than a given threshold value and the number of collisions that occurred with respect to transmissions of data bursts by the node previous to the given control interval is greater than or equal to the number of data bursts received by the node from one or more other nodes in the network in the given control interval.

11. A method, comprising the steps of:
collecting information at a node of an optical-based communications network, wherein at least a portion of the collected information pertains to congestion in the optical-based communications network;
adjusting a transmission rate of the node in response to at least a portion of the collected information such that the node operates under a stable transmission schedule with respect to asynchronous data bursts;
wherein the information collecting step further comprises collecting, for a given control interval, feedback information representing the number of collisions that occurred with respect to transmissions of data bursts by the node previous to the given control interval;
wherein the information collecting step further comprises collecting, for a given control interval, information representing the number of data bursts received by the node from one or more other nodes in the network in the given control interval;
wherein the information collecting step further comprises collecting, for a given control interval, information representing the number of data bursts transmitted by the node before the given control interval over a time period equivalent to a round trip propagation delay between the node and a given destination node in the network; and
computing a data burst allocation indicator from the collected information;
wherein the transmission rate adjusting step further comprises increasing the transmission rate when the data burst allocation indicator is greater than a given threshold value and the number of collisions that occurred with respect to transmissions of data bursts by the node previous to the given control interval is less than the number of data bursts received by the node from one or more other nodes in the network in the given control interval.

12. A method, comprising the steps of:
collecting information at a node of an optical-based communications network, wherein at least a portion of the collected information pertains to congestion in the optical-based communications network;
adjusting a transmission rate of the node in response to at least a portion of the collected information such that the node operates under a stable transmission schedule with respect to asynchronous data bursts;
wherein the information collecting step further comprises collecting, for a given control interval, feedback information representing the number of collisions that occurred with respect to transmissions of data bursts by the node previous to the given control interval;
wherein the information collecting step further comprises collecting, for a given control interval, information representing the number of data bursts received by the node from one or more other nodes in the network in the given control interval;
wherein the information collecting step further comprises collecting, for a given control interval, information representing the number of data bursts transmitted by the node before the given control interval over a time period equivalent to a round trip propagation delay between the node and a given destination node in the network; and
computing a data burst allocation indicator from the collected information;
wherein the transmission rate adjusting step further comprises increasing the transmission rate when the data burst allocation indicator is less than or equal to a given threshold value and the number of collisions that occurred with respect to transmissions of data bursts by the node previous to the given control interval is equal to the number of data bursts received by the node from one or more other nodes in the network in the given control interval.

13. A method, comprising the steps of:

collecting information at a node of a time-domain wavelength interleaved network, wherein at least a portion of the collected information pertains to congestion in the network;

computing a data burst allocation indicator value from at least a portion of the collected information; and scheduling, at the node, transmission of asynchronous data bursts from the node in response to the data burst allocation indicator value.

14. The method of claim 13, wherein the scheduling step comprises a random transmission schedule.

15. Apparatus, comprising:

a memory; and a processor, associated with a node of an optical-based communications network, coupled to the memory and operative to: (i) collect information at the node, wherein at least a portion of the collected information pertains to congestion in the optical-based communications network; (ii) compute a data burst allocation indicator value from at least a portion of the collected information; and (iii) adjust a transmission rate of the node in response to the data burst allocation indicator value such that the node operates under a stable transmission schedule with respect to asynchronous data bursts.

16. The apparatus of claim 15, wherein the transmission rate adjusting operation further comprises adjusting the transmission rate such that the node operates under a fair transmission schedule.

17. The apparatus of claim 15, wherein the transmission rate adjusting operation further comprises adjusting the transmission rate such that the node operates under a random transmission schedule.

18. The apparatus of claim 15, wherein the information collecting operation and the transmission rate adjusting operation are performed, for the given control interval, for one or more node pairs formed by the node and one or more destination nodes in the network.

19. The apparatus of claim 15, wherein the optical-based communications network is a time-domain wavelength interleaved network.

20. Apparatus, comprising:

a memory; and a processor, associated with a node of a time-domain wavelength interleaved network, coupled to the memory and operative to: (i) collect information at the node, wherein at least a portion of the collected information pertains to congestion in the network; (ii) compute a data burst allocation indicator value from at least a portion of the collected information; and (iii) randomly schedule, at the node, transmission of asynchronous data bursts from the node in response to the data burst allocation indicator value.

* * * * *

UNITED STATES PATENT AND TRADEMARK OFFICE
CERTIFICATE OF CORRECTION

PATENT NO. : 7,573,815 B2 Page 1 of 1
APPLICATION NO. : 11/072163
DATED : August 11, 2009
INVENTOR(S) : Brzezinski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this

Seventh Day of September, 2010

David J. Kappos
*Director of the United States Patent and Trademark Office*